Feb. 9, 1943.  T. GAVAGNIN  2,310,775
MOTOR TRACTOR
Filed Oct. 13, 1939  3 Sheets-Sheet 1
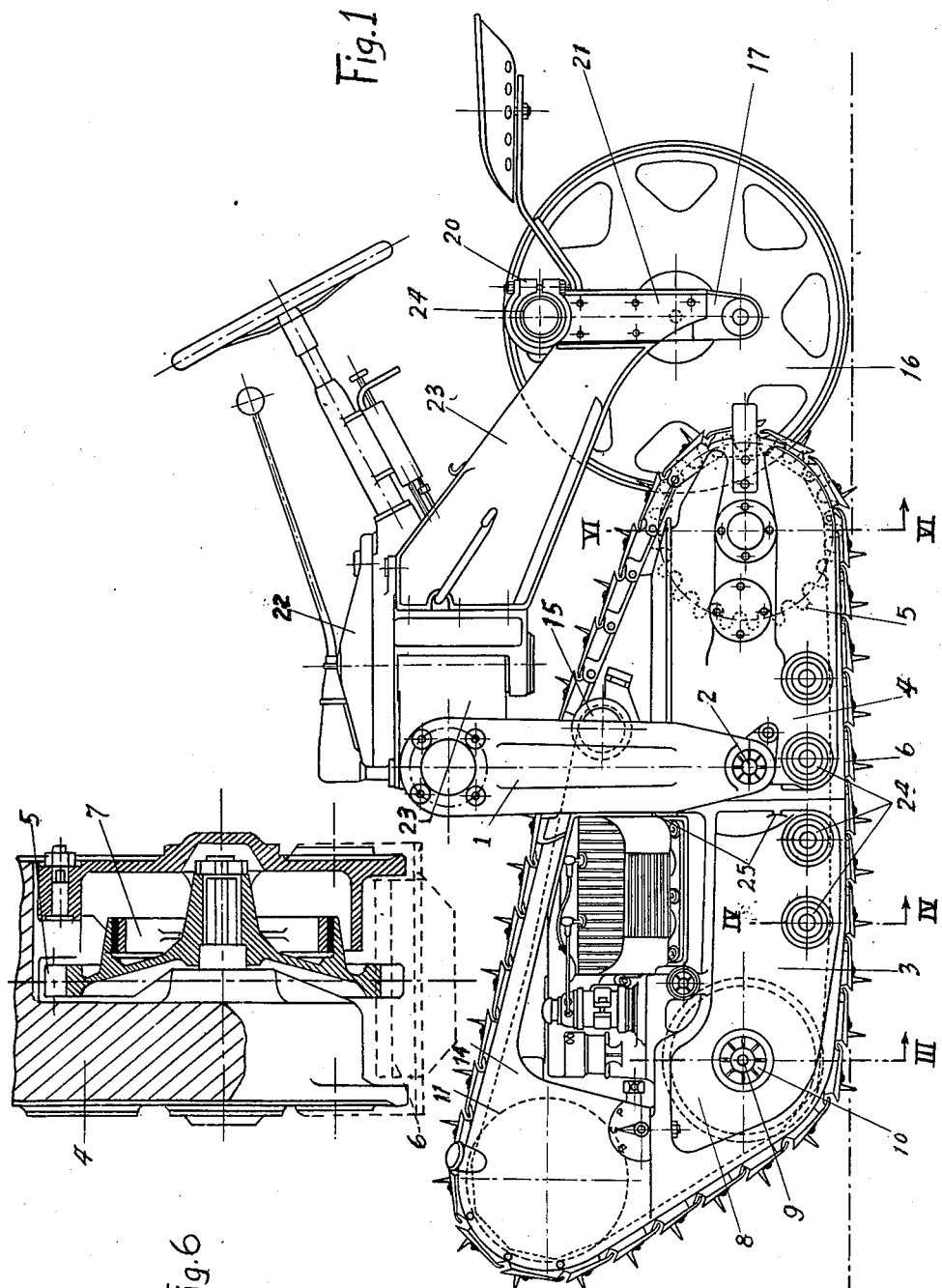

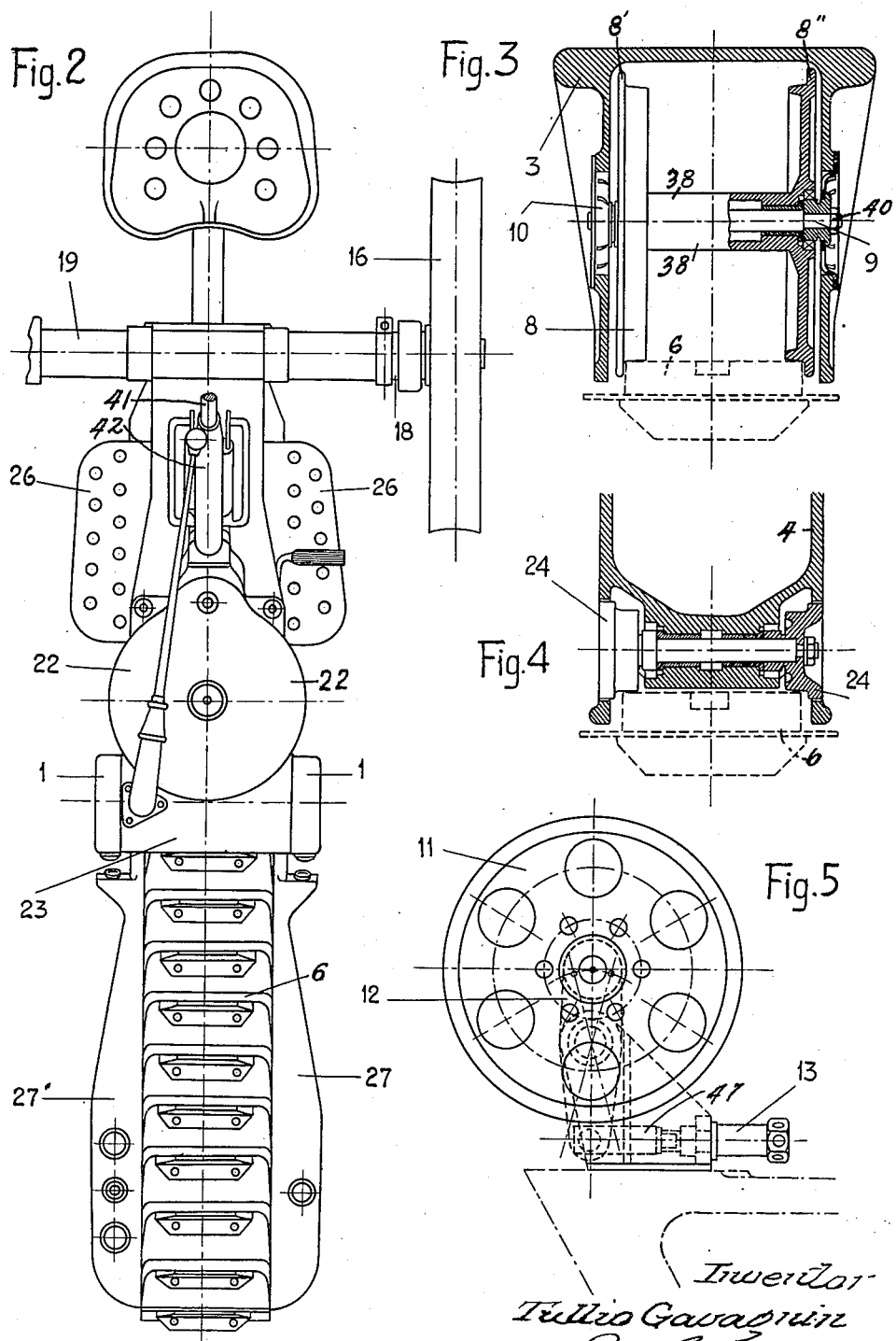

Feb. 9, 1943. T. GAVAGNIN 2,310,775
MOTOR TRACTOR
Filed Oct. 13, 1939 3 Sheets-Sheet 3
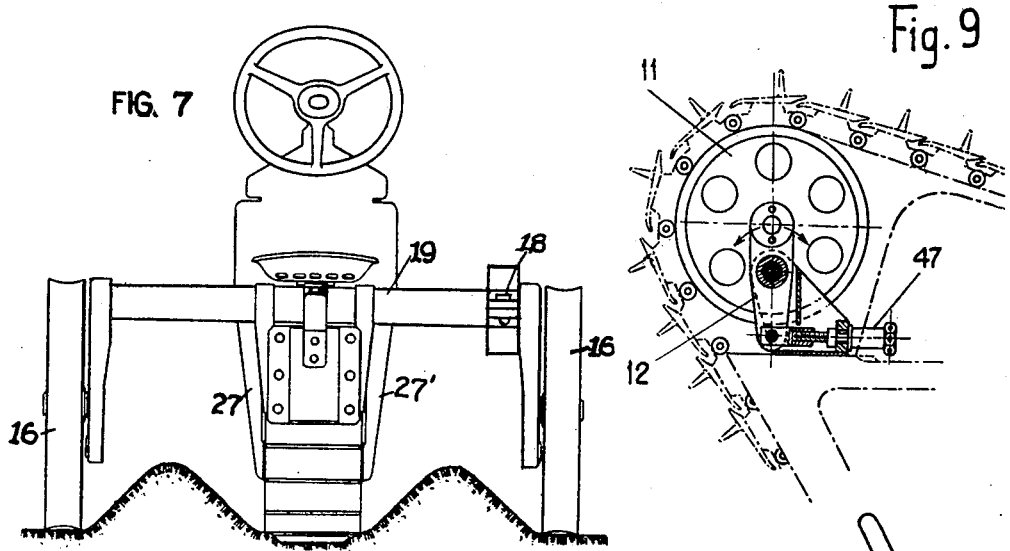
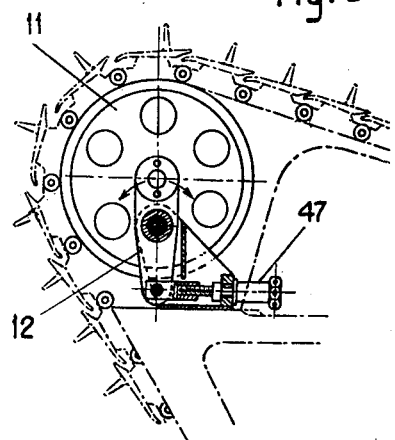
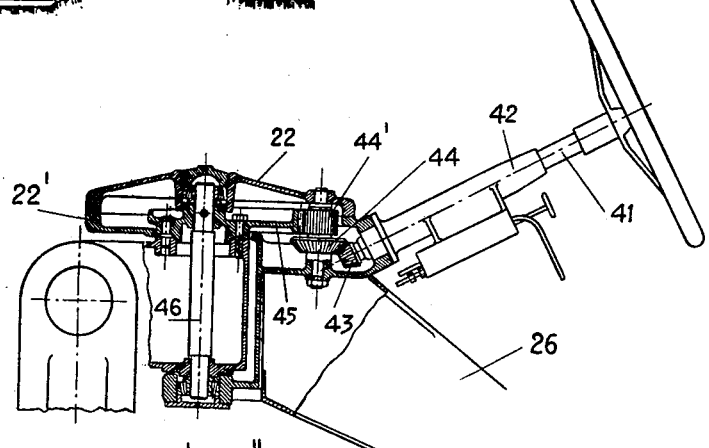
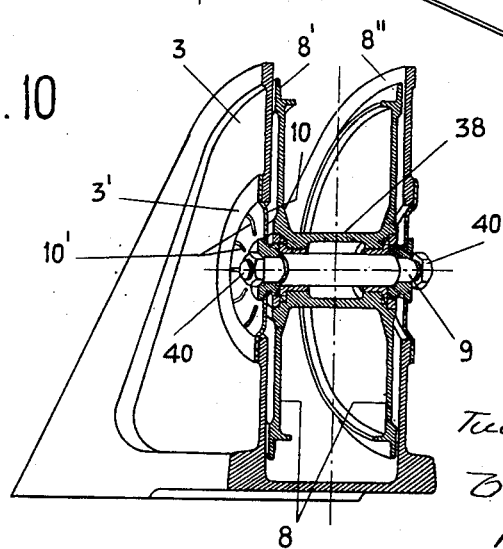

Patented Feb. 9, 1943

2,310,775

UNITED STATES PATENT OFFICE 2,310,775

MOTOR TRACTOR

Tullio Gavagnin, Genoa-Pegli, Italy; vested in the Alien Property Custodian

Application October 13, 1939, Serial No. 299,371
In Italy October 20, 1938

5 Claims. (Cl. 180—9.1)

This invention has for its object a motor tractor having a single endless track that permits the mechanical traction even where the particular arrangement of the cultures in rows does not permit the employment of tractors of usual design. The motor tractor according to the invention on the other hand is quite different from the single track-laying tractors that have been constructed or designed up to date in that, due to the particular construction and arrangement of the motor and transmission parts as well as due to the arrangement of the tensioning rollers and to the particular manner of hinging the rear carriage to the fore track-laying driving unit a contrivance is obtained, which is exceedingly rugged and stable and permits the employment of motors developing powers which are remarkably higher than those employed until now and this without substantially increasing the dimensions of the unit.

The invention will be better understood from the following specification with reference to the attached drawings in which:

Figs. 1 and 2 are respectively a side elevation and a plan view of a single-endless-track tractor;

Fig. 3 is a section on line III—III of Figure 1;

Fig. 4 is a section on line IV—IV of Figure 1;

Fig. 5 is a detail view of the upper track-tensioning roller and

Fig. 6 is a section on line VI—VI of Figure 1.

Figure 7 is a rear view of the machine, showing the same in use, and indicating how the track of the wheels is varied.

Figure 8 is a broken view in elevation, partly in section, showing the steering mechanism details.

Figure 9 is a detail of the upper tension roller, showing the relation to the endless track outlined in dotted lines.

Figure 10 is a broken perspective of the lower front roller mounting.

The single endless track tractor according to the invention comprises like almost all like tractors, a fore driving unit provided with an endless track carrying all the driving members, and a rear part, which serves to stabilise the unit tractor as well as steering and trailing member, connected by a swivel to the fore or driving member.

The new tractor presents however some remarkable differences in its design and arrangement of the different parts which constitute the said two members, so as to eliminate the inconveniences, as will be seen from the following specification.

According to the invention the driving part, carrying the endless track, comprises a frame which is constituted, as shown particularly in Figure 1, of a pair of castings or carters 3 and 4 connected together by means of strong bolts or the like 25.

On the front block or carter 3 the cylinder block and the motor parts are mounted, while the rear block or carter 4 contains the change speed gear as well as the gears for driving gear 5 which meshes with band 6 which, together with its shoes, constitutes the endless track of the tractor, which track may be of any suitable type.

The two carters when assembled together constitute at their bottom end, at least in their middle part, a continuous straight surface and serve as running and guide surfaces for the endless track or band 6. In order to render this running of the track easier, on the lower part of both the carters rollers 24 are mounted, preferably constructed as particularly shown in Figure 4 and which serve as bearing, running and guide rollers.

The track laying band 6 is tensioned between the driving gear 5, the fore roller 8, which is mounted to the end of the fore carter 3 and the upper tensioning roller 11. Due to the fact that these three members are arranged at the apices of a triangle, the endless track, when mounted on the tractor, assumes a profile which is like that of almost all the tractors (of the endless track type) including the twin-track tractors. This profile has been found to be the most convenient in practice and may be defined substantially as a scalene triangle having the longer side up, the shorter side running obliquely from the fore part downwardly and the third side constituting the base of the unit.

The endless track is driven in the usual manner by gear 5 which is suitably driven and is integral with the drum of the expansion brake 7 fitted as shown in Figure 6.

The front roller 8, which constitutes the foremost part of the bearing section of the unit and which therefore is the part that is more subject to shocks is preferably constituted and mounted as shown in Figure 3. As may be seen from this figure, roller 8, Figures 1 and 3, is constituted in practice by a pair of wheels, each provided with an outer flange 8', 8" for guiding and holding the endless track, and connected together by means of a tubular shaft 38 loosely mounted on axle 9, which is suitably springingly supported in suitable apertures of carter 3. In the preferred embodiment, as shown in Figures 3 and 10, the elastic supporting and shock absorbing members are constituted by a pair of spring cups 10 conveniently slitted radially as shown at 10' in order to give them a greater elasticity. These cups keep the parts together by means of radial flanges abutting against the periphery of the hub-shaped borders 31 of the said apertures of carter 3' and the whole is kept in place by means of suitable tightening nuts 40, with counter nuts, splines or other safety means.

The upper roller 11, Figures 1, 5 and 8, which acts as endless track-supporting and tensioning means is mounted on a shiftable fork 12, Figures 5 and 9, the stem of which is slidably mounted in a suitable sleeve 47 and is pushed outwardly by a suitably large spring (not shown) the tension of which may be adjusted by means of screw sleeve 13.

The endless track is additionally guided upwardly by a roller 15, Figure 1, suitably supported on the rear carter 4.

On the carter assembly, and precisely in a position towards the fore part of the rear carter 4, a large forked yoke 1 is hinged on large journals 2 and is connected at its upper end to a block in which the steering gear is swiveled. This gear, which may be of any suitable construction, in the example as shown, comprises a casing 22, 22' integral of the rear frame members 26, and in which the steering shaft 41 is rotatably mounted in sleeve 42. Shaft 41 carries at its end a mitre pinion 43 meshing with gear 44. This gear 44 meshes with a gear sector 45 rotatable on journal 46 and integral with block 23 to which the forked yoke 1 is attached. To the part 22, 22' the frame 26, 18, 19 carry supporting members 17, on which the carrying wheels are mounted for height adjustment. The supporting member 17 is arranged on the tubular member 18 which is slidably mounted in sleeve member 19. The member 17 carrying the wheel is slidably supported within a sheath member 21, integral with strut 26, and may be adjusted as to height by means of tubular members, as pins or the like indicated in Figure 1. To both sides of the carter assembly the fuel and oil reservoirs 27 and 27', Figure 2, are mounted in a suitable guard 14. These reservoirs project with their curved line profile beyond the endless track and thus serve to avoid that the track comes directly into contact with the leaves or other delicate parts of rapidly growing plants. For this same purpose it is convenient that, as said, the wheels may be registered in their height, so as to avoid that such rapidly growing plants, as tobacco, Indian corn and the like, be bowed excessively under the axle 19. For this same purpose it is convenient that the wheel track may be varied suitably so as to allow to adjust this track in accordance with the width of the rows of the cultures, so as to permit the plants to pass within the space between the parts 26 of the frame and the wheels 16 thus avoiding the crushing of these plants by the wheels.

From the preceding the advantages of the new type of single track tractor are apparent, which, while permitting the track carrying unit to freely oscillate about the journals 2 in order to fit to the conditions of the ground, it is adapted to be steered with the utmost facility due to the position of said journals near the gravity center of the driving unit. This latter, as said, is practically constituted by a very rugged, rigid metallic block, although suitable spring members be provided for the endless track, said members being such as to permit all necessary deformations of the track as well as to absorb the shocks on the front part of the track.

These advantages and still some others will be apparent to the skilled in the art, as well as will be apparent the many possible variations of design, which do not lie out of the basic principle of the invention.

I claim:

1. A motor tractor comprising a driving unit and a wheeled supporting and trailing member hinged to the driving unit, the driving unit being constituted of a pair of carters rigidly connected together, so as to form a carter block, a motor within one of said carters, a large gear wheel, driven by the motor, guide rollers fitted at the periphery of said carters, tensioning and shock-absorbing rollers fitted at the forward end of the carter block, an endless track meshing with said gear wheel and running on said guide rollers, tensioning and shock-absorbing rollers and around the carter block and assuming a substantially triangular shape, a pair of upright members and means for connecting the said driving unit to the lower end of a pair of said upright members, and a head block connecting the upper ends of said members to form a unit for supporting a rear end wheel structure.

2. A motor tractor according to claim 1, wherein the shock-absorbing rollers include a lower roller mounted on a spring support so as to absorb the shocks and the fore upper roller has its supporting part additionally hinged, so as to permit the necessary deformations of the endless track and to absorb the shocks.

3. A motor tractor according to claim 1, in which fuel and oil reservoirs are fitted at the fore upper end of the driving unit, under a suitable guard and project with their curved-line profile beyond the endless track.

4. A motor tractor according to claim 1, in which the gear wheel is fitted at the rear end of the rear carter block and is integral with the usual brake drum.

5. A motor tractor comprising a driving unit comprising a front carter and a rear carter, means for rigidly connecting these carters together, a tensioning roller, fitted at the upper fore carter end, a shiftable fork including a supporting stem and supporting the tensioning roller, a hinged connection between the fork proper and the supporting stem, a shock absorbing roller mounted at the lower foremost end of the said fore carrier, the said roller being constituted of a pair of flanged wheels connected together by means of a hollow shaft and being supported on resilient cup-shaped members, guide rollers at intermediate positions of both carters, a driving gear at the rear end of the rear carter block, a motor fitted on the fore carter block, an endless track fitted about said guide and tensioning rollers and about said carters and meshing with said driving gear, fuel reservoirs projecting out of the profile of the endless track at the fore upper end of the driving unit, a pair of upright members hinged in proximity of the gravity center of said driving unit, and a block rigidly connecting these upright members together to provide a rear wheel support.

TULLIO GAVAGNIN.